United States Patent
Backer et al.

(10) Patent No.: US 11,118,142 B2
(45) Date of Patent: Sep. 14, 2021

(54) DETERGENT FORMULATION CONTAINING MIXED-CHARGE POLYMERS AND NONIONIC SURFACTANT

(71) Applicants: Rohm and Haas Company, Collegeville, PA (US); Union Carbide Corporation, Seadrift, TX (US)

(72) Inventors: Scott Backer, Phoenixville, PA (US); Paul Mercando, Pennsburg, PA (US); Eric Wasserman, Collegeville, PA (US)

(73) Assignees: Rohm and Haas Company, Collegeville, PA (US); Union Carbide Corporation, Seadrift, TX (US)

( * ) Notice: Subject to any disclaimer, the term of this patent is extended or adjusted under 35 U.S.C. 154(b) by 134 days.

(21) Appl. No.: 16/630,969

(22) PCT Filed: Jun. 20, 2018

(86) PCT No.: PCT/US2018/038404
§ 371 (c)(1),
(2) Date: Jan. 14, 2020

(87) PCT Pub. No.: WO2019/022865
PCT Pub. Date: Jan. 31, 2019

(65) Prior Publication Data
US 2020/0224127 A1    Jul. 16, 2020

Related U.S. Application Data

(60) Provisional application No. 62/535,998, filed on Jul. 24, 2017.

(51) Int. Cl.
| | |
|---|---|
| C11D 1/72 | (2006.01) |
| C11D 3/37 | (2006.01) |
| C08F 120/14 | (2006.01) |
| C11D 1/83 | (2006.01) |
| C11D 3/00 | (2006.01) |
| C11D 11/00 | (2006.01) |

(52) U.S. Cl.
CPC .......... *C11D 3/3796* (2013.01); *C08F 120/14* (2013.01); *C11D 1/83* (2013.01); *C11D 3/0005* (2013.01); *C11D 11/0023* (2013.01)

(58) Field of Classification Search
CPC ......... C11D 1/72; C11D 11/0023; C11D 1/83; C11D 3/3796
See application file for complete search history.

(56) References Cited

U.S. PATENT DOCUMENTS

| | | | |
|---|---|---|---|
| 3,288,770 A | 11/1966 | Butler | |
| 3,671,502 A | 6/1972 | Samour et al. | |
| 5,232,622 A | 8/1993 | Jones et al. | |
| 6,191,098 B1 * | 2/2001 | Rodrigues | C08F 8/00 510/475 |
| 6,660,711 B1 | 12/2003 | Price et al. | |
| 7,793,601 B2 | 9/2010 | Davison | |
| 8,791,271 B2 | 7/2014 | Siemer et al. | |
| 8,858,803 B2 | 10/2014 | Guliashvili et al. | |
| 9,017,652 B1 | 4/2015 | Askar et al. | |
| 10,828,398 B2 * | 11/2020 | Jiang | A61L 24/046 |

FOREIGN PATENT DOCUMENTS

| | | |
|---|---|---|
| EP | 112592 A2 | 7/1984 |
| EP | 1202816 | 5/2002 |
| EP | 1221475 B1 | 11/2005 |
| GB | 2104091 | 3/1983 |
| JP | 2012201764 | 10/2012 |
| JP | 2014100882 | 6/2014 |
| JP | 2015140341 * | 8/2015 |
| JP | 2015208946 | 11/2015 |
| JP | 2016047871 | 4/2016 |
| WO | 2007089001 | 8/2007 |
| WO | 2013033275 | 3/2013 |
| WO | 2016040489 | 3/2016 |
| WO | 2019022865 | 1/2019 |
| WO | 2019022866 | 1/2019 |
| WO | 2019022868 | 1/2019 |
| WO | 2019022869 | 1/2019 |

OTHER PUBLICATIONS

Structure search for polymer contained in U.S. Appl. No. 16/631,466.*
Lindner, Jean-Pierre, "Imidazolium-Based Polymers via the Poly-Radziszewski Reaction," Macromolecules, 2016, p. 2046-2053, vol. 49.
Parrott, R., et. al., "Chloride stress corrosion cracking in austenitic stainless steel," Health and Safety Executive of the U.K., 2011, p. 1-53, RR902.

* cited by examiner

*Primary Examiner* — Charles I Boyer
(74) *Attorney, Agent, or Firm* — Steven W. Mork

(57) ABSTRACT

A detergent formulation comprises 0.5 to 10 weight-percent mixed-charge polymer and one to 10 weight-percent nonionic surfactant, where weight-percent is relative to total detergent formulation weight, and wherein the mixed-charge polymer comprises quaternary ammonium groups and carboxylate groups extending as pendant side groups from the polymer backbone.

5 Claims, No Drawings

DETERGENT FORMULATION CONTAINING MIXED-CHARGE POLYMERS AND NONIONIC SURFACTANT

BACKGROUND OF THE INVENTION

Field of the Invention

The present invention relates to detergent formulations that contain mixed-charge polymers that can be substantially free of chloride or any halide.

Introduction

Mixed-charge polymers are useful in detergent formulations including automatic dishwashing detergent formulations and laundry detergent formulations. In automatic dishwashing, mixed-charge polymers reduce spotting on dishes. In laundry applications, mixed-charge polymers inhibit soil redeposition.

Preparing mixed-charge polymers typically requires polymerization of a monomeric cationic chloride salt with an anionic monomer or monomers that are converted to anions after polymerization with the monomeric cationic chloride salt. The presence of chloride in such a process is problematic. Free chloride is corrosive to metal, including the metal typically used for polymerization reactors. Therefore, the reactors used for synthesis of mixed-charge polymers must be regularly monitored for wear and must be regularly repaired or they must be glass-lined or made of special chloride-resistant alloy. It is desirable to be able to prepare mixed-charge polymers without having the problems associated with chloride counterions so less expensive steel reactors can be used without degradation caused by the presence of chloride.

Similarly, use of mixed-charge polymers comprising chloride ions can be harmful to metal components exposed to the chloride ions. For example, use of a mixed-charge polymer in an automatic dishwasher detergent exposes the polymer to the metallic components inside the dishwasher. Chloride ions present with the mixed-charge polymer can corrode and degrade the metal components of the dishwasher, which is undesirable. Therefore, mixed-charge polymers that are substantially free of chloride ions, or any halide ions, are desirable, particularly mixed-charge polymers that are suitable for use in detergent formulations for laundry and/or automatic dishwashing applications.

BRIEF SUMMARY OF THE INVENTION

The present invention provides a solution to the problem of preparing mixed-charge polymers without the problems of chloride ions and, thereby, providing mixed-charge polymers that are substantially free of chloride ions and that are suitable for use in detergent formulations including detergents for laundry and automatic dishwashing applications Surprisingly, the present invention is a result of discovering monomeric cations and monomeric anions can be paired as counterions to one another and polymerized to form mixed-charge polymers in the presence of less than one mole-percent (and even in an absence of) chloride ions or any halide ion, relative to total moles of cationic monomer. Compositions comprising the mixed-charged polymer can be "substantially free" of chloride or any halide, which means the composition can contain one weight-percent or less chloride or any halide based on composition weight and can actually be free of chloride or any other halide. In fact, compositions of the present invention can be substantially free of chloride or any halide without having to treat the composition to remove halide. Determine wt % halide by ion chromatography. Even more surprising is the discovery that such mixed-charge polymers are effective for use as detergents in laundry and automatic dishwashing detergent formulations.

In a first aspect, the present invention is a detergent formulation comprising 0.5 to 10 weight-percent mixed-charge polymer and one to 10 weight-percent nonionic surfactant, where weight-percent is relative to total detergent formulation weight, and wherein the mixed-charge polymer comprises multiple independent pendant quaternary ammonium functionalities and carboxylate functionalities and wherein the pendant quaternary ammonium group has the structure of Formula I (the portion shown in brackets) with A attached to the backbone (represented by the curved line) of the polymer:

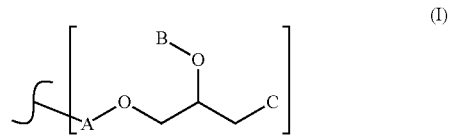

where A is selected from a group consisting of $CH_2$ and $C=O$, B is selected from a group consisting of hydrogen, an acetoyl group, and a propionyl group; and C is selected from a group consisting of Formula II and Formula III, where Formula II is:

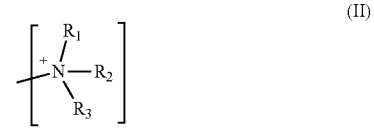

where $R_1$, $R_2$ and $R_3$ are independently selected from a group consisting of $C_1$-$C_{12}$ alkyl or arylalkyl groups; and Formula III is

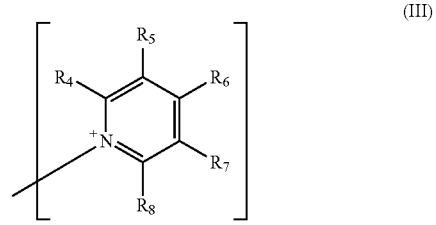

where $R_4$-$R_8$ are independently selected from a group consisting of hydrogen and $C_1$-$C_{12}$ alkyl groups.

The detergent formulations of the present invention are useful, for example, in applications such as automatic dishwashing and laundry detergent formulations.

DETAILED DESCRIPTION OF THE INVENTION

"And/or" means "and, or alternatively". Ranges include endpoints unless otherwise stated.

The present invention is a detergent formulation that comprises a mixed-charge polymer at a concentration of 0.5 weight-percent (wt %) or more and can be present at a concentration of one wt % or more, 2 wt % or more, 3 wt % or more, 4 wt % or more 5 wt % or more, 6 wt % or more, 7 wt % or more, 8 wt % or more and even 9 wt % or more while at the same time is present at a concentration of 10 wt5 or less and can be 9 wt % or less, 8 wt % or less, 7 wt % or less, 6 wt % or less, 5 wt % or less, 4 wt % or less and even 3 wt % or less with wt % based on total detergent formulation weight.

The mixed-charge polymer has a carbon chain backbone with multiple pendant cationic functionalities and multiple pendant anionic functionalities. The pendant anionic functionalities and pendant cationic functionalities can be pendant side chains or pendant side groups, meaning the cationic and anionic functionalities can be part of either a pendant side chain or a pendant side group of the mixed-charge polymer. A "pendant side chain" is an oligomeric or polymeric extension off from a backbone while a "pendant side group" is an extension off from a backbone that is neither oligomeric nor polymeric. For simplicity herein, the term "pendant functionality" will be used to generally refer to the pendant cationic functionality and/or pendant anionic functionality. For avoidance of doubt, pendant functionalities are covalently bound the polymer backbone.

The mixed-charge polymer comprises "independent" pendant quaternary ammonium functionalities and pendant carboxylate functionalities extending from the polymer backbone. That means that a pendant functionality of the present mixed-charge polymer can contain either a cationic functionality or an anionic functionality but a single pendant functionality does not contain both a cationic functionality and an anionic functionality.

Desirably, mixed-charge polymers of the present invention, and/or the detergent formulation comprising the mixed-charge polymer of the present invention, comprise less than 10 mole-percent (mol %), preferably 8 mol % or less, more preferably 5 mol % or less, even more preferably 3 mol % or less, yet more preferably 2 mol % or less, yet even more preferably one mol % or less, 0.5 mol % or less, 0.1 mol % or less and most preferably zero mol % (an absence of) chloride ions and/or halide ions wherein mol % is relative to total moles of pendant cationic functionalities in the mixed-charge polymer. In this regard, the mixed-charge polymer avoids application challenges associated with chloride and/or halides. Determine mol % of halides by ion chromatography.

Desirably, the pendant cationic functionality is a pendant quaternary ammonium functionality. Preferably, the pendant cationic functionality has the structure of Formula I (the portion shown in brackets) with A attached to the backbone (represented by the curved line) of the polymer:

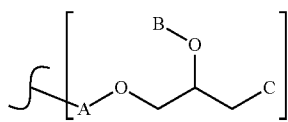
(I)

where A is selected from a group consisting of

(or, "$CH_2$" for short) and

(or "$C=O$" for short), B is selected from a group consisting of hydrogen, an acetoyl group, and a propionyl group; and C is selected from a group consisting of Formula II and Formula III, where Formula II is:

(II)

where $R_1$, $R_2$ and $R_3$ are independently selected from a group consisting of $C_1$-$C_{12}$ alkyl or arylalkyl groups; and Formula III is:

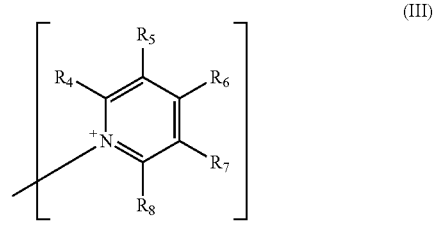
(III)

where $R_4$-$R_8$ are independently selected from a group consisting of hydrogen and $C_1$-$C_{12}$ alkyl groups. The groups of Formula II and Formula III are quaternary ammonium cationic groups. Quaternary ammonium cations are understood herein to be groups with a cationic nitrogen having attached to the cationic nitrogen four carbon-nitrogen bonds. As in Formula III, an aromatic double bond between the nitrogen cation and a carbon serves as two carbon-nitrogen bonds.

One desirable unsaturated quaternary ammonium cation of Formula I has $R_1$, $R_2$ and $R_3$ all hydrogens, A is $CH_2$, B is hydrogen and C is Formula II where each of $R_4$, $R_5$ and $R_6$ are —$CH_3$ groups.

Another desirable unsaturated quaternary ammonium cation of Formula I has $R_1$ and $R_2$ are hydrogens, $R_3$ is —$CH_3$, A is $C=O$, B is hydrogen and C is Formula II where each of $R_4$, $R_5$ and $R_6$ are —$CH_3$ groups.

Yet another desirable unsaturated quaternary ammonium cation of Formula I has $R_1$, $R_2$ and $R_3$ all hydrogens, A is $CH_2$, B is hydrogen and C is Formula III where each of $R_7$, $R_8$, $R_9$, $R_{10}$ and $R_{11}$ are hydrogen.

The pendant anionic functionality is desirably a carboxylate anion. As such, the pendant anionic functionality desirably has the structure of Formula IV, with the curved line representing the polymer backbone:

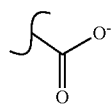
(IV)

Desirably, the pendant anionic functionality is the remnant of copolymerizing into the polymer backbone a deprotonated carboxylic acid selected from a group consisting of acrylic acid, methacrylic acid, itaconic acid, maleic acid, and any combination of two or more than two thereof. Preferably, the pendant anionic functionality originates from the copolymerization of a deprotonated methacrylic acid or acrylic acid.

Desirably, the mixed-charge polymer has a weight-average molecular weight of 2000 daltons or more, and can be 3000 daltons or more, 5000 daltons or more 10,000 daltons or more 20,000 daltons or more 30,000 daltons or more, 40,000 daltons or more, 50,000 daltons or more, 60,000 daltons or more, 70,000 daltons or more and even 80,000 daltons or more while at the same time is generally 100,000 daltons or less and can be 90,000 daltons or less, 80,000 daltons or less, 70,000 daltons or less, 60,000 daltons or less, 50,000 daltons or less, 40,000 daltons or less and even 30,000 daltons or less. Determine weight-average molecular weight of the mixed-charge polymer by gel permeation chromatography.

A particularly desirable method for preparing the mixed-charge polymers of the present invention is from a cationic/anionic monomer pair. A cationic/anionic monomer pair has a cationic monomer and an anionic monomer that serve as counter ions to one another. It is desirable for there to be 1:0.9 to 1:1.1 molar ratio, preferably a 1:0.95 to 1:1.05 molar ratio, and even more preferably 1:1 molar ratio of anionic functionalities of anionic monomers to cationic functionalities of cationic monomers in the composition of the present invention at a pH of 8. If the identity and concentration of the cationic and anionic monomer is known in the composition, calculate the molar ratio of anionic functionalities to cationic functionalities from the known concentration and identities of the monomers. If the identity and concentration is unknown, experimentally determine the molar ratio of anionic functionalities to cationic functionalities by isolating two samples of the composition comprising the cationic and anionic monomers, adding a quantitative nonionic internal standard to each, running one through a cationic ion exchange column and the other through an anionic ion exchange column and then quantitatively determining the concentration of cationic and anionic monomer in each using nuclear magnetic resonance (NMR) spectroscopy.

Each of the monomers of the cationic/anionic monomer pair has an ethylenic unsaturation (a C=C double bond), and preferably only one non-aromatic C=C double bond per monomer to avoid crosslinking during polymerization.

Polymerizing such cationic/anionic monomer pairs inherently results in mixed-charge polymers having pendant anionic and cationic functionalities that serve as counterions to one another without requiring the presence of anions such as chloride, halide or any other free anion that might otherwise serve as a counterion to the pendant cationic functionality.

Compositions comprising the cationic/anionic monomer pair, particularly during polymerization of the cationic/anionic monomer pair to from the mixed-charge polymer, desirably have less than one mole-percent (mol %), preferably 0.5 mol % or less, more preferably 0.1 mol % or less and most preferably is free of chloride. Moreover, the compositions of the present invention can have less than one mole-percent (mol %) halide, preferably 0.5 mol % or less, more preferably 0.1 mol % or less and most preferably is free of any halide. Mol % chloride and halide is relative to total moles of cationic functional groups that are part of the cationic monomers. Determine mol % chloride and mol % halide by ion chromatography in which a test solution is passed through a column and the concentration of chloride (or other halide) ion is measured by the area under a peak whose elution time corresponds to that observed in a run of a calibration solution containing known levels of chloride (or other halide) ion. Detection is desirably done by suppressed conductivity.

The cationic monomer is desirably selected from a group consisting of unsaturated quaternary ammonium cations. Preferably, the cationic monomer is an unsaturated quaternary ammonium cation having the structure of Formula V:

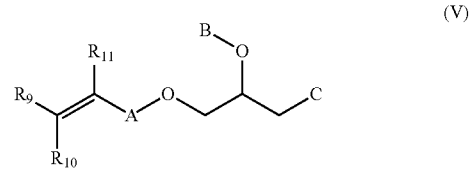

where: $R_9$, $R_{10}$ and $R_{11}$ are independently selected from a group consisting of hydrogen, methyl and ethyl; A is selected from a group consisting of $CH_2$ and C=O, B is selected from a group consisting of hydrogen, an acetoyl group, and a propionyl group; and C has a structure of one structure selected from a group consisting of Formula II and Formula III, as described above.

The anionic monomer is desirably an ethylenically unsaturated carboxylate anion. Preferably, the ethylenically unsaturated carboxylate anion is a deprotonated carboxylic acid selected from a group consisting of acrylic acid, methacrylic acid, itaconic acid, maleic acid, and any combination of two or more than two thereof. Particularly desirably, the ethylenically unsaturated carboxylate anion is the deprotonated form (carboxylate form) of methacrylic acid or acrylic acid. The anionic monomer in the composition of the present invention can be a combination of more than one ethylenically unsaturated carboxylate anion as described above.

It is desirable to directly synthesize the cationic monomer/anionic monomer ion pair It is desirable to directly synthesize the cationic monomer/anionic monomer ion pair together simultaneously so as to avoid having to replace a counterion on the cationic monomer with the anionic monomer. In that regard, compositions used to prepare the cationic monomer/anionic monomer pair as well as compositions used to polymerize the cationic monomer/anionic monomer pair to form the mixed-charge polymer of the present invention desirably contain less than one wt %, preferably 0.5 wt % or less, more preferably 0.1 wt % or less chloride relative to composition weight and preferably contain less than one wt %, preferably 0.5 wt % or less, more preferably 0.1 wt % or less of any halide relative to Generally, the cationic/anionic monomer pair is in a solvent such a water when synthesized and/or when polymerized to form the mixed-charge polymer. Solvent is generally 90 wt % or less, preferably 80 wt % or less, still more preferably 70 wt % or less, and can be 60 wt % or less, 50 wt % or less, 40 wt % or less, 30 wt % or less, 20 wt % or less, 10 wt % or less, 5 wt % or less and even zero wt % of the combined weight of solvent and cationic/anionic monomer pair. At the same time, solvent can be present at a concentration of greater than zero wt %, 5 wt % or more, 10 wt % or more, 20 wt % or more, 30 wt % or more, 40 wt % or more, 50 wt % or more, 60 wt % or more, 70 wt % or more, 80 wt % or more and even 90 wt % or more based on combined weight of solvent and cationic/anionic monomer pair.

Copolymerize the monomeric ion pairs by free radical polymerization of the carbon-carbon double bonds of the cationic and anionic monomers.

Preferably, after completing the polymerization to form the mixed-charge polymer, the composition comprises less than one mol % of non-polymerized anionic monomer, even more preferably 0.5 mol % or less, even more preferably 0.1 mol % or less and most zero mol % non-polymerized anionic monomer, with mol % of anionic monomer relative to total moles of cationic groups on the mixed-charge polymer.

In addition to the mixed-charge polymer, the detergent formulation further comprises a nonionic surfactant. The nonionic surfactant is present at a concentration of one wt % or more and can be present at a concentration of one wt % or more, 2 wt % or more, 3 wt % or more, 4 wt % or more, 5 wt % or more, 6 wt % or more, 7 wt % or more and even 8 wt % or more while at the same time is present at a concentration of 15 wt % or less, typically 10 wt % or less and can be 9 wt % or less, 9 wt % or less, 8 wt % or less, 7 wt % or less, 6 wt % or less, 5 wt % or less, 4 wt % or less and even 3 wt % or less with wt % relative to total detergent formulation weight.

Suitable nonionic surfactants include, for example, any one or combination of alkoxylate surfactants and polyether polyols. Alkoxylate surfactants include compounds having the formula RO—(M)x—(N)n—OH or R—O—(M)x—(N)y—O—R' in which M and N are units derived from alkylene oxides (of which one is ethylene oxide), x and y are integers from 0 to 20, provided at least one of them is not zero, R represents a $C_6$-$C_{22}$ linear or branched alkyl group, and R' represents a group derived from the reaction of an alcohol precursor with a $C_6$-$C_{22}$ linear or branched alkyl halide, epoxyalkane, or glycidyl ether. Particularly desirable alkoxylate surfactants include those based on ethyle oxide, propylene oxide and/or butylene oxide. Examples of desirable alkoxylates include linear alcohol alkoxylates such as those sold under the trademark DOWFAX™ 20B102 (DOWFAX is a trademark of The Dow Chemical Company).

Surfactants are desirable for lifting stains and soil from fabrics in laundry applications and from dishware in automatic dishwashing applications. In addition to the nonionic surfactant the detergent formulation can comprise, or be free of, anionic surfactants and/or cationic surfactants. Anionic surfactants are desirable in laundry detergent formulations. Suitable anionic surfactants include any one or any combination of more than one selected from linear alkyl-substituted benzene sulfonates, fatty alcohol sulfates and sulfates of ethoxylated fatty alcohols. When present, the concentration of anionic surfactant is typically one wt % or more, and can be 5 wt % or more, 10 wt % or more 15 wt % or more, 20 wt % or more and even 25 wt % or more and at the same time is typically 30 wt % or less, and can be 25 wt % or less, 20 wt % or less, 15 wt % or less, 10 wt % or less and even 5 wt % or less with wt % relative to total detergent formulation weight.

The detergent formulation can further comprise an inorganic builder. Inorganic builders are useful in automatic dishwashing detergents to enhance detergency. Inorganic builders can, for example, be any one or combination of more than one component selected from a group consisting of phosphates, silicates, carbonates and oxygen releasing materials. Phosphates include orthophosphates (such as trisodium phosphate and disodium phosphate) and complex phosphates (such as tetrasodium pyrophosphate, sodium tripolyphosphate, and sodium tetraphosphate and sodium hexametaphosphate). Silicates include sodium silicate ($Na_2SiO_3$). Carbonates includes sodium carbonate, sodium bicarbonate and sodium percarbonate. Oxygen releasing materials include sodium perborate, sodium percarbonate, and sodium persulfate.

The detergent formulation can comprise organic bleaching agents such as tetraacetylethylenediamine and/or urea peroxide.

When present, the total concentration of inorganic builder is generally 20 wt % or more and can be 25 wt % or more 30 wt % or more 35 wt % or more 40 wt % or more, 45 wt % or more and even 50 wt % or more while at the same time is typically 60 wt % or less, generally 55 wt % or less, 50 wt % or less, 45 wt % or less, 40 wt % or less, 35 wt % or less and even 30-wt % or less based on total weight of the detergent formulation.

The detergent formulation can also comprise one or more than one enzyme such as, for example, α-amylase from Bacillus and/or protease from Bacillus. The total concentration of enzyme, when present, is typically one wt % or more and can be 2 wt % or more, 3 wt % or more 4 wt % or more, 5 wt % or more, 6 wt % or more, 7 wt % or more, 8 wt % or more and even 9 wt % or more while at the same time is generally 10 wt % or less, and can be 9 wt % or less, 9 wt % or less, 7 wt % or less, 6 wt % or less, 5 wt % or less, 4 wt % or less, 3 wt % or less and even 2 wt % or less relative to total detergent formulation weight.

One of the benefits of the present detergent formulation is that it can have a low concentration of chloride anions, and halide ions altogether. The mixed-charge polymer component does not have to bring with it a chloride or other halide counterion to the cationic functionality like other mixed-charge polymers do. As a result, the detergent formulation of the present invention can have a chloride, and even a halide, concentration that is one mol % or less, preferably 0.5 mol % or less, more preferably 0.3 mol % or less, even more preferably 0.1 mol % or less and can be zero mol % relative to pendant cationic functionalities on the mixed-charge polymer.

EXAMPLES

Synthesis of Cationic/Anionic Monomer Pair

Example 1

3-(allyloxy)-2-hydroxy-N,N,N-trimethylpropan-1-aminium methacrylate

Fit a 3-neck, two-liter fully jacketed round bottom flask with an overhead stirrer, dry ice condenser and a temperature probe. Into the flask add 225 grams (g) of a 30.04 weight-percent (wt %) aqueous solution (1.14 mole) of trimethylamine (TMA) and 0.20 g (675 ppm) of 4-hydroxy-2,2,6,6-tetramethyl-1-piperidinyloxy (also known as "4-hydroxyTEMPO" or "4-HT") inhibitor. Set the jacket temperature to one degree Celsius (° C.) and turn on the overhead stirrer to 240 revolutions per minute. When the temperature of the TMA solution reaches 5° C. add 98.5 g (1.15 moles) glacial methacrylic acid dropwise over one hour. Maintain the reaction temperature between 4 and 8° C. using the reactor jacket temperature and by adjusting the glacial methacrylic acid addition rate. The resulting aminium salt solution is clear and slightly yellow-orange in color. Stir for an additional 30 minutes and then allow the solution to slowly reach room temperature over the course of one hour. Set the jacket coolant temperature to 40° C. When the solution temperature is 30° C. add 131 g (1.15 mol) of allyl glycidyl ether (AGE) to the solution dropwise over 90 minutes while controlling the temperature to stay in a range of 38-42° C. by adjusting rate of addition. After completing addition of AGE the solution temperature increased to 43° C. over 10 minutes and then decreased to 38° C. over 15 minutes. Stir the solution at 38° C. for 2 hours during which time the solution changes from being cloudy to being a single clear phase indicating reaction completion.

The resulting product is a combination of anion/cation monomer pairs dissolved in water with a 65.3 wt % combined monomer concentration in the solution.

Quantitative nuclear magnetic resonance spectroscopy (NMR) of the solution in $D_2O$ reveals that the solution contains 96.0 mol % of a primary product 3-(allyloxy)-2-hydroxy-N,N,N-trimethylpropan-1-aminium methacrylate with the balance being a mixture of 3-(allyloxy)-2-hydroxypropyl methacrylate and 3-(allyloxy)propane-1,2-diol.

The resulting primary product 3-(allyloxy)-2-hydroxy-N,N,N-trimethylpropan-1-aminium methacrylate is a composition comprising a 1:1 mole ratio of cationic monomer with an anionic monomer counterion. The cationic monomer has the structure of Formula I where $R_1$, $R_2$ and $R_3$ all hydrogens, A is $CH_2$, B is hydrogen and C is Formula II where each of $R_4$, $R_5$ and $R_6$ are —$CH_3$ groups. The anionic monomer counterion is methacrylate. The resulting product is free of halides, particularly chloride and free of free anions.

Polymerization of Cationic/Anionic Monomer Pair to form Mixed-charge Polymer

Example 2

Polymerization of Example 1 to Form Mixed-Charge Polymer (High Concentration of Monomers and Lower Mw Resulting Polymer)

Equip a 2-liter round-bottom flask with an overhead stirrer, thermocouple, nitrogen bubbler, reflux condenser, syringe pumps and reciprocating pumps. Charge the flask with 137.5 g of deionized water, 68.96 g of the 65.3 wt % solution of the product of Example 1 containing primarily 3-(allyloxy)-2-hydroxy-N,N,N-trimethylpropan-1-aminium methacrylate, and 1.66 g of a 0.15 wt % solution of iron(II) sulfate in deionized water. Raise the temperature of the resulting solution in the flask to 72° C. using a heating mantle. Pour directly into the flask a solution of 4.76 g of a 26.5 wt % solution of sodium metabisulfite (SMBS) in deionized water. Simultaneously begin three feeds into the flask: (a) a solution of 1.42 g sodium persulfate in 15 g deionized water; (b) a solution of 28.24 g SMBS in 60 g deionized water; and (c) 160 g glacial acrylic acid. Feed (a) into the flask over 95 minutes, (b) over 80 minutes and (c) over 90 minutes. Maintain the solution temperature in the flask at 73° C. After completing the additions, maintain the solution at 73° C. for an addition 10 minutes. Add a solution of 0.265 g sodium persulfate in 6 g deionized water over 10 minutes and then hold at 73° C. for another 20 minutes. Allow the solution to cool while adding 75 g of a 50 wt % aqueous solution of sodium hydroxide followed by addition of 1.36 g of a 35 wt % aqueous solution of hydrogen peroxide, followed by 48 g of a 50 wt % aqueous solution of sodium hydroxide. Add 10 g of deionized water to rinse.

The resulting aqueous solution is 44.84 wt % solids with a pH of 6.1, a residual acrylic acid level of 203 weight parts per million relative to aqueous solution weight. The resulting solution (and, hence, polymer) are free of halides, particularly chloride.

The pendant cationic functionality has the structure of Formula I where $R_1$, $R_2$ and $R_3$ all hydrogens, A is $CH_2$, B is hydrogen and C is Formula II where each of $R_4$, $R_5$ and $R_6$ are —$CH_3$ groups.

The mixed-charge polymer has a weight-average molecular weight of 12,400 daltons and a number average molecular weight of 2,800 daltons as determined by gel permeation chromatography.

Example 3

Polymerization of Example 1 to Form Mixed-Charge Polymer (Higher Mw)

Equip a 2-liter round-bottom flask with an overhead stirrer, thermocouple, nitrogen bubbler, reflux condenser, syringe pumps and reciprocating pumps. Charge the flask with 137.5 g of deionized water, 32.08 g of the 65.2 wt % solution of the product of Example 1 containing primarily 3-(allyloxy)-2-hydroxy-N,N,N-trimethylpropan-1-aminium methacrylate, and 1.66 g of a 0.15 wt % solution of iron(II) sulfate in deionized water. Raise the temperature of the resulting solution in the flask to 72° C. using a heating mantle. Pour directly into the flask a solution of 4.15 g of a 15.7 wt % solution of sodium metabisulfite (SMBS) in deionized water. Simultaneously begin three feeds into the flask: (a) a solution of 0.73 g sodium persulfate in 15 g deionized water; (b) a solution of 14.7 g SMBS in 60 g deionized water; and (c) 180 g glacial acrylic acid. Feed (a) into the flask over 95 minutes, (b) over 80 minutes and (c) over 90 minutes. Maintain the solution temperature in the flask at 73° C. After completing the additions, maintain the solution at 73° C. for an addition 10 minutes. Add a solution of 0.265 g sodium persulfate in 3.5 g deionized water over 10 minutes and then hold at 73° C. for another 20 minutes. Allow the solution to cool while adding 75 g of a 50 wt % aqueous solution of sodium hydroxide followed by addition of 1.8 g of a 35 wt % aqueous solution of hydrogen peroxide, followed by 40 g of a 50 wt % aqueous solution of sodium hydroxide. Add 18 g of deionized water to rinse.

The resulting aqueous solution is 45.08 wt % solids with a pH of 6.4, a residual acrylic acid level of less than 30 weight parts per million relative to aqueous solution weight. The resulting solution and polymer are free of halides, particularly chloride.

The pendant cationic functionality has the structure of Formula I where $R_1$, $R_2$ and $R_3$ all hydrogens, A is $CH_2$, B is hydrogen and C is Formula II where each of $R_4$, $R_5$ and $R_6$ are $CH_3$ groups.

The mixed-charge polymer has a weight-average molecular weight of 20,400 daltons and a number average molecular weight of 5,600 daltons as determined by gel permeation chromatography.

Use of Mixed-Charge Polymer in Automatic Dishwashing Detergent

To demonstrate the efficacy of the mixed-charge polymer of the present invention in an automatic dishwashing detergent, compare the dishwashing results of a detergent comprising Examples 2 and 3 with dishwashing results of a detergent comprising a chlorinated variation of Example 2 (Comparative Example A) and Example 3 (Comparative Example B).

Comparative Example A: Chloride-Containing Variation of Example 2.

Equip a round-bottom flask with an overhead stirrer, thermocouple, nitrogen bubbler, reflux condenser, syringe pumps and reciprocating pumps. Charge the flask with 137.5 g of deionized water, 1.66 g of a 0.15 wt % solution of iron (II) sulfate in deionized water. Raise the temperature of the resulting solution in the flask to 72° C. using a heating mantle. Pour directly into the reactor a solution of 0.17 g SMBS in 3.5 g deionized water.

Simultaneously begin three feeds into the flask: (a) a solution of 0.57 g sodium persulfate in 15 g deionized water; (b) a solution of 6.23 g SMBS in 30 g deionized water; and (c) a mixture of 160 g glacial acrylic acid and 53.3 g of a 75 wt % aqueous solution of (3-acrylamidoropyl)trimethylammonium chloride (APTAC). Feed (a) into the flask over 95 minutes, (b) over 80 minutes and (c) over 90 minutes. Maintain the solution temperature in the flask at 73° C. After completing the additions, maintain the solution at 73° C. for an addition 20 minutes. Add a solution of 0.26 g sodium persulfate in 3.5 g deionized water over 10 minutes and then hold at 73° C. for another 20 minutes. Add another solution of 0.26 g sodium persulfate in 3.5 g deionized water over 10 minutes and then hold at 73° C. for another 20 minutes. Allow the solution to cool while adding 75 g of a 50 wt % aqueous solution of sodium hydroxide followed by addition of 1.6 g of a 35 wt % aqueous solution of hydrogen peroxide, followed by 40 g of a 50 wt % aqueous solution of sodium hydroxide. Add 30 g of deionized water to rinse. The resulting solution is 42.81 wt % solids in water with a pH of 5.6, a residual acrylic acid level of less than 25 weight parts per million relative to solution weight.

The resulting polymer has pendant carboxylic acid functionalities and separate pendant cationic groups with a chloride counterion having the following structure:

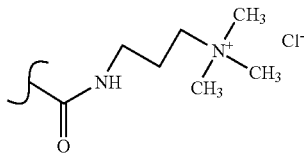

The resulting polymer has a weight-average molecular weight of 19,000 daltons and a number average molecular weight of 6,200 daltons as determined by gel permeation chromatography.

Comparative Example B: Chloride-Containing Variation of Example 3.

Equip a round-bottom flask with an overhead stirrer, thermocouple, nitrogen bubbler, reflux condenser, syringe pumps and reciprocating pumps. Charge the flask with 140 g of deionized water, 1.66 g of a 0.15 wt % solution of iron (II) sulfate in deionized water. Raise the temperature of the resulting solution in the flask to 72° C. using a heating mantle. Pour directly into the reactor a solution of 0.19 g SMBS in 3.5 g deionized water.

Simultaneously begin three feeds into the flask: (a) a solution of 0.6 g sodium persulfate in 15 g deionized water; (b) a solution of 6.71 g SMBS in 30 g deionized water; and (c) a mixture of 180 g glacial acrylic acid and 26.65 g of a 75 wt % aqueous solution of (3-acrylamidoropyl)trimethylammonium chloride (APTAC). Feed (a) into the flask over 95 minutes, (b) over 80 minutes and (c) over 90 minutes. Maintain the solution temperature in the flask at 73° C. After completing the additions, maintain the solution at 73° C. for an addition 20 minutes. Add a solution of 0.265 g sodium persulfate in 3.5 g deionized water over 10 minutes and then hold at 73° C. for another 20 minutes. Add another solution of 0.26 g sodium persulfate in 3.5 g deionized water over 10 minutes and then hold at 73° C. for another 20 minutes. Allow the solution to cool while adding 65 g of a 50 wt % aqueous solution of sodium hydroxide followed by addition of 2.85 g of a 35 wt % aqueous solution of hydrogen peroxide, followed by 65 g of a 50 wt % aqueous solution of sodium hydroxide. Add 40 g of deionized water to rinse. The resulting solution is 41.50 wt % solids in water with a pH of 5.8, a residual acrylic acid level of less than 23 weight parts per million relative to solution weight.

Comparative Example B has the same pendant cation functionality as Comparative Example A, just a different concentration of them.

The resulting polymer has a weight-average molecular weight of 23,400 daltons and a number average molecular weight of 7,500 daltons as determined by gel permeation chromatography.

Automatic Dishwashing Detergent and Evaluation

Prepare a detergent composition according to Table 1, one composition using each of Example 2, Example 3, Comparative Example A and Comparative Example B as the "Polymer Component".

TABLE 1

| Component | Wt % of Composition |
|---|---|
| Sodium citrate | 30 |
| Sodium carbonate | 20 |
| Sodium bicarbonate | 10 |
| Sodium percarbonate | 15 |
| N,N,N',N'-tetraacetylethylenediamine (TAED) | 4 |
| Linear alcohol alkoxylate non-ionic surfactant (e.g., DOWFAX ™ 20B102; DOWFAX is a trademark of The Dow Chemical Company) | 5 |
| a-amylase from Bacillus | 1 |
| protease from bacillus | 2 |
| 1-hydroxyethane-1,1-diphosphonic acid, sodium salt | 2 |
| Sodium sulfate | 6 |
| Polymer Component | 5 |

Evaluate each detergent composition according to the following procedure. Each detergent formulation is used in a 30 cycles of washing test using "Cycle 1" in a Miele SS-ADW, Model G122SC European (230 Volt, 15 amp, 50 Hertz) dishwasher with fuzzy logic and water softener disengaged. Use water with a hardness of 375 weight parts per million (ppm) and a ratio of $C^{2+}:Mg^{2+}$ of 3:1 and a temperature of 18-30° C. Feed water to the dishwasher by recycling from a 200 gallon tank using a 3 horsepower pump.

The dishwasher has three racks. On the top rack distribute stainless steel flatware (multiple butter knives, forks, teaspoons and tablespoons) as ballast. In the middle rack position 4 LIBBEY™ 10 ounce Collins glasses (LIBBEY is a trademark of LIBBEY Glass, Inc.) and one SCOTT ZWEISEL TITRAN 11.2 ounce Collins Longdrink glass centrally located along the left side of the rack to minimize contact with rack posts. In the bottom rack place the following articles as ballast: one dinner plate and one salad plate (CORELLE™ VITRELLE™ Tableware; CORELLE and VITRELLE are a trademarks of WKI Holding company)), one salad plate and one cereal bowl (ROOM ESSENTIALS™ Stoneware; ROOM ESSENTIALS is a trademark of Target Brands, Inc.), one dinner plate (ROOM ESSENTIALS melamine plasticware, one dinner plate (THRESHOLD™ Stoneware; THRESHOLD is a trademark of Target Brands, Inc.) and one bowl (IKEA™ Fargrik Stoneware; IKEA is a trademark of Inter IKEA Systems B.V.).

Place a 50 gram sample of frozen food in a vial in the front, middle of the bottom rack so that the spray wand of the washer will send water into the vial prior to the first of the 30 cycles. Table 2 identifies the composition of the food soil. Prepare the food soil in 1000 g gram batches and divide into 50 g aliquots prior to freezing.

Run the dishwasher through 30 cycles with the dishes and frozen food soil. After cycle 30 remove a centrally located LIBBEY Collins glass and a SCOTT ZWIESEL TITRAN Collins Longdrink glass and evaluate it for filming and spotting.

TABLE 2

| Ingredient | Mass (g) |
|---|---|
| Tap Water | 713.5 |
| Margarine | 101.9 |
| Egg Yolk | 51.0 |
| Gravy Powder | 25.5 |
| Potato Starch | 5.1 |
| Mustard | 25.5 |
| Ketchup | 25.5 |
| Milk | 51.0 |
| Benzoic Acid | 1.0 |

Two trained panelists rate the glasses for scale and spotting from 1 (no scale or spotting observed) to 5 (very heavy scale or spotting observed) using a light box. Average the value for the two glasses to provide a final performance value for the detergent composition. Results are shown in Table 3.

TABLE 3

| Polymer | Example 2 | Comparative Example A | Example 3 | Comparative Example B |
|---|---|---|---|---|
| Filming (scale) | 2.3 | 2.3 | 2.2 | 2.4 |
| Spotting | 1.4 | 1.1 | 2.7 | 3.1 |

The results show that the halide-free mixed-charge polymer of the present invention provides comparable, if not improved, results over the corresponding-chloride containing polymer. Hence, the halide-free mixed-charge polymers of the present invention are suitable for automatic dishwashing detergents and provide an option that does not contribute chloride ions.

The invention claimed is:

1. A detergent formulation comprising 0.5 to 10 weight-percent mixed-charge polymer and one to 10 weight-percent nonionic surfactant, where weight-percent is relative to total detergent formulation weight, and wherein the mixed-charge polymer comprises multiple independent pendant quaternary ammonium functionalities and carboxylate functionalities and wherein the pendant quaternary ammonium group has the structure of Formula I with A attached to the backbone of the polymer:

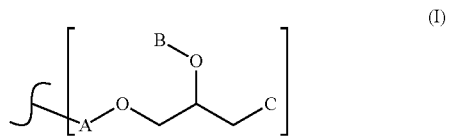

where A is selected from a group consisting of $CH_2$ and $C=O$, B is selected from a group consisting of hydrogen, an acetoyl group, and a propionyl group; and C is selected from a group consisting of Formula II and Formula III, where Formula II is

where $R_1$, $R_2$ and $R_3$ are independently selected from a group consisting of $C_1$-$C_{12}$ alkyl or arylalkyl groups; and Formula III is

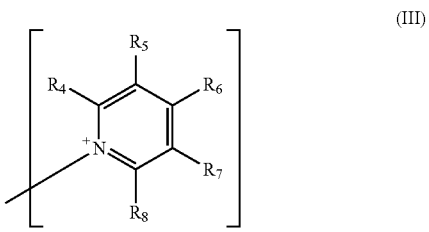

where $R_4$-$R_8$ are independently selected from a group consisting of hydrogen and $C_1$-$C_{12}$ alkyl groups.

2. The detergent formulation of claim 1, wherein the weight-average molecular weight of the mixed-charge polymer is between 2,000 and 100,000 daltons as determined by gel permeation chromatography.

3. The detergent formulation of claim 1, wherein the detergent formulation contains less than one wt % chloride relative to detergent weight.

4. The detergent formulation of claim 1, wherein the detergent formulation further comprises 20-60 weight-percent inorganic builder relative to total detergent formulation weight.

5. The detergent formulation of claim 1, wherein the detergent formulation further comprises 1-30 weight-percent anionic surfactant based on total detergent formulation weight.

* * * * *